United States Patent [19]

Bierling et al.

[11] Patent Number: 4,771,331

[45] Date of Patent: Sep. 13, 1988

[54] MOTION COMPENSATING FIELD INTERPOLATION METHOD USING A HIERARCHICALLY STRUCTURED DISPLACEMENT ESTIMATOR

[75] Inventors: Matthias Bierling, Hanover; Robert Thoma, Langenhagen; Hans-Georg Musmann, Salzgitter-Bad, all of Fed. Rep. of Germany

[73] Assignee: ANT Nachrichtentechnik GmbH, Backnang, Fed. Rep. of Germany

[21] Appl. No.: 22,975

[22] Filed: Mar. 6, 1987

[30] Foreign Application Priority Data

Mar. 8, 1986 [EP] European Pat. Off. ......... 86103153.2

[51] Int. Cl.$^4$ .............................................. H04N 7/12
[52] U.S. Cl. ..................................... 358/136; 358/135
[58] Field of Search ................. 358/136, 105, 135, 133

[56] References Cited

U.S. PATENT DOCUMENTS

| | | | |
|---|---|---|---|
| 4,383,272 | 5/1983 | Netravali et al. | 358/136 |
| 4,581,638 | 4/1986 | Chiaviglione et al. | 358/135 |
| 4,633,490 | 12/1986 | Goertzel et al. | 358/135 X |
| 4,651,207 | 3/1987 | Bergmann et al. | 358/136 |
| 4,661,849 | 4/1987 | Hinman | 358/105 X |
| 4,663,660 | 5/1987 | Fedele et al. | 358/136 |

FOREIGN PATENT DOCUMENTS

0154125 9/1985 European Pat. Off. .

OTHER PUBLICATIONS

C. Cafforio, F. Rocca, "Methods for Measuring Small Displacements of Television Images", IEEE Trans, Inform. Theory, vol. IT-22, No. 5, pp. 573-579, Sep. 1976.
J. Klie, "Codierung von Fernsehsignalen für niedrige Übertragungsbitraten", Ph. D. dissertation, Tech. Univ. of Hannover, Hannover, Germany, 1978.
M. Bierling, "A Differential Displacement Estimation Algorithm with Improved Stability", 2nd Int. Tech. Symposium on Optical and Electro-Optical Applied Science and Engineering, Cannes, Dec. 1985.
A. Furukawa, T. Koga, K. Iinuma, "Motion-Adaptive Interpolation for Videoconference Poctures", Proc. of the Int. Conf. on Comm. 1985, pp. 707-710, Amsterdam, 1984.
H. C. Bergmann, "Motion Adaptive Frame Interpolation", Proc. of the 1984 Int. Zurich Seminar on Digital Communications, D2.1-D2.5, Zurich, 1984.
B. G. Haskell and R. L. Schmidt, "A Low-Bit-Rate Interframe Coder for Videotelephone",—American Telephone and Telegraph Company, The Bell System Technical Journal, vol. 54, No. 8, pp. 1475 to 1495, Oct. 1975.
A. N. Netravali and J. D. Robbins, "Motion-Compensated Television Coding: Part I", American Telephone and Telegraph Company, The Bell System Technical Journal, vol. 58, No. 3, Mar. 1979—pp. 631 to 671.
Beyer, "Displacement-Schätzverfahren für Fernsehbildsignale mit minimaler Schätzfehlervarianz, VDI-Verlag GmbH, 1986, pp. V-IX and 45 to 111.
H. G. Musmann, P. Pirsch, H.-J. Grallert, "Advances in Picture Coding", Proc. of the IEEE, vol. 73, pp. 523-548, Apr. 1985.
R. Paquin, E. Dubois, "A Spatio-Temporal Gradient Method for Estimation the Displacement Vector Field in Time-Varying Imagery", Computer Vision, Graphics, and Image Processing 21, pp. 205-221, 1983.

(List continued on next page.)

Primary Examiner—Howard W. Britton
Assistant Examiner—Victor R. Kostak
Attorney, Agent, or Firm—Spencer & Frank

[57] ABSTRACT

A motion compensating field interpolation method which allows the interpolation of several fields between every two transmitted fields of a digital television sequence. Using the model of translatorily displaced objects, a hierarchically structured displacement estimator is applied to cope with relatively large displacements. It provides a displacement vector with integer components for each picture element of the fields to be interpolated. A change detector is used to assure zero displacement vectors in unchanged areas. A two-coefficient spatio-temporal filter interpolates each picture element of the fields to be interpolated.

12 Claims, 13 Drawing Sheets

OTHER PUBLICATIONS

J. R. Jain, A. K. Jain, "Displacement Measurement and Its Application in Interframe Image Coding", *IEEE Trans. on Comm.*, vol. Com-29, No. 12, pp. 1799-1808, Dec. 1981.

G. Kummerfeldt et al., "Coding Television Signals at 320 and 64k bit/s", *2nd Int. Techn. Symposium on Optical and Electro-Optical Applied Science and Engineering*, Cannes, vol. 594, Dec. 1985, pp. 119-128.

C. Cafforio et al., "The Differential Method for Image Motion Estimation", *Image Sequence Processing and Dynamic Scene Analysis*, vol. F2, 1983, pp. 104-124.

MOTION COMPENSATING FIELD INTERPOLATION METHOD USING A HIERARCHICALLY STRUCTURED DISPLACEMENT ESTIMATOR

BACKGROUND OF THE INVENTION

The present invention relates to a method for a motion compensating field interpolation as well as the use of this method. Such a method is particularly suitable for the reconstruction of omitted fields of television sequences.

The problem of interpolating fields in digital television sequences arises in the case of field frequency conversion. In source coding applications, fields which are dropped in the coder to allow for a transmission of television signals in digital channels with very low transmission bit rates have to be reconstructed. The CCITT Study Group XV is currently investigating television codecs with 384 kbit/s transmission rate. The aim is to provide video conference services using the Integrated Services Digital Network ISDN. In order to achieve this data rate, it seems to be necessary to reduce the number of transmitted fields in addition to known source coding techniques. A recently presented paper on this subject (G. Kummerfeldt et al, "Coding Television Signals at 320 and 64 kbit/s", 2nd Int. Tech. Symposium on Optical and Electro-Optical Applied Science and Engineering, Cannes, December 1985) uses a field subsampling by a factor of 4:1 combined with a hybrid coding algorithm. Then, at the receiver, three fields have to be interpolated between every two transmitted fields.

The problem is to generate a field at a given temporal position between two successive fields of a television sequence. Since the temporal luminance changes are often times caused by moving objects, a simple field repetition technique, which inserts the nearest available field, yields jerkily moving objects (see B. G. Haskell et al, "A low bit-rate interframe coder for videotelephone", Bell Syst. Techn. J., Vol. 54, No. 8, pp. 1475–1495, October 1975). Another simple approach is linear interpolating by temporal filtering (see J. Klie, "Codierung von Fernsehsignalen füniedrige Übertragungsbitraten", Ph.D. dissertation, Tech. Univ. of Hannover, Germany 1978). In this case for each picture element to be interpolated, a weighted average of the corresponding picture elements at the same spatial position is calculated. This interpolation technique is able to adapt to luminance changes which, for example, are only due to illumination changes of the scene contents. However, blurring becomes visible in moving areas depending on the amount of motion.

Hence, motion compensating interpolation (MCI) techniques have been developed, which were reviewed in a paper by H. G. Musmann et al, "Advances in Picture Coding", Proc. of the IEEE, Vol. 73, pp. 523–548, April 1985. MCI-techniques take into account the motion of objects to preserve the natural impression of motion. The main difficulty is to provide a sufficiently precise estimation of the motion parameters. In order to limit the complexity of the algorithm, most of the MCI-techniques are based on the assumption of pure translatorily displaced objects in the image plane, for example, see the Kummerfeldt et al paper, the paper by J. R. Jain et al, "Displacement measurement and its application in interframe image coding", IEEE Trans. on Comm., Vol. Com-29, No. 12, pp. 1799–1808, December 1981, the paper by A. Furukawa et al, "Motion-adaptive interpolation for videoconference pictures", Proc. of the Int. Conf. on Comm., 1984, pp. 707–710, Amsterdam, 1984, and the paper by H. C. Bergmann, "Motion adaptive frame interpolation", Proc. of the 1984 Int. Zurich Seminar on Digital Communications, D2.1–D2.5, Zurich, 1984, as well as the presented technique. In the Kummerfeldt et al and Jain et al papers, the images are subdivided into a fixed number of rectangular blocks. One displacement vector is determined for each block belonging to a moving area, whereas in the Furukawa et al paper only one representative displacement vector is determined for each moving area. The algorithm described in the Bergmann paper proposes the estimation of one displacement vector for each picture element in the moving image parts to obtain an improved rendition of motion in the reconstructed television sequence.

SUMMARY OF THE INVENTION

It is an object of this invention to provide an improved method of motion compensating field interpolation of one or more fields between every two transmitted fields of a digital television sequence, which method is of the type wherein a displacement vector is generated by an iteration process for each picture element of the field to be interpolated and zero displacement vectors are assigned to picture elements in unchanged picture areas by means of a change detector, and which copes with large displacements.

It is another object of this invention to provide uniquely defined displacement vector fields which are valid for the temporal positions of the fields to be interpolated, rather than for the transmitted fields.

A further object of this invention is to present suitable applications of this method.

The above objects are generally achieved according to the present invention in that in a method of motion compensating field interpolation of the above mentioned type: a hierarchically structured displacement estimation is applied during the generation of the displacement vectors in order to cope with large displacements, in that after motion compensation by means of the vector estimated in the first steps of iteration, the residual displacement is estimated in the next steps more precisely; the displacement vector is provided with integer components; and a symmetrized motion compensating iteration is carried out resulting in displacement vectors defined for a temporal position of the fields to be interpolated such that an interpolation filter interpolates each picture element of the fields to be interpolated by means of a displacement vector and a picture element of every two transmitted fields.

According to the preferred embodiment of the invention, during the first steps of the hierarchically structured displacement estimation, the image signal is low-pass filtered and large measurement windows are applied to estimate large displacements which serve as initial values for the next steps of the iteration process, and during the last steps of the hierarchically structured displacement estimation the unfiltered image signal and small measurement windows are applied to estimate the displacement vector components locally adaptive.

According to a further preferred feature of the invention, the absolute frame differences are subjected to a threshold comparison operation in the change detector in order to assign a signal value to every picture element indicating that it belongs either to the unchanged area or to the changed area, and the resulting information is post-processed by means of a median filter using measurement windows such that the boundaries between changed and unchanged areas of a binary change detection mask are adapted to the boundaries of the moving objects.

The method according to the invention, including the preferred features mentioned above, can be used for the reconstruction at the receiver end of one or more omitted television images between every two transmitted fields of a digital television sequence, for the generation of one or more additional fields between every two successive images, or for the motion compensating noise reduction of digital television sequences.

The invention describes the complete algorithm of a motion compensating field interpolator that is applicable for the reconstruction of omitted fields, e.g., in a video conference codec. The hierarchically structured displacement estimation technique combined with a change detector copes with large displacements, which occur even in typical video conference sequences, if several successive fields have been dropped at the transmitter. In contrast to the algorithm in the Bergmann paper, this technique provides uniquely defined displacement vector fields which are valid for the temporal positions of the fields to be interpolated, rather than for the transmitted fields. This further reduces the jerkiness in the motion compensating interpolated sequence. The displacement estimation technique is based on the differential displacement estimation algorithm described in a paper by M. Bierling, "A Differential Displacement Estimation Algorithm with Improved Stability", 2nd Int. Tech. Symposium on Optical and Electro-Optical Applied Science and Engineering, Cannes, December 1985.

The features and advantages of the invention will be more apparent from the detailed description hereunder taken in conjunction with the accompanying drawings.

BRIEF DESCRIPTION OF THE DRAWINGS

In FIG. 5A windows of 13 by 13 picture elements were used, whereas in FIG. 5B windows of 65 by 65 picture elements were used. The image signal covered by the windows was bandlimited by a FIR filter (FIL1, Table 2) and subsampled by a factor of 4:1 in the horizontal and vertical directions.

FIG. 10A shows the original field of the sequence "Trevor";

FIG. 10B illustrates the frame difference signal caused by the luminance changes between the transmitted fields, with positive and negative differences being displayed with white and black luminance values, and a zero difference being gray displayed;

FIG. 10C shows the field generated by linear interpolation without motion compensation; and FIG. 10D shows the field generated by motion compensating interpolation according to the invention with a hierarchically structured displacement estimator with the parameters listed in Table 1 having been used.

FIG. 11A shows the original field of the sequence;

FIG. 11B shows frame difference signal;

FIG. 11C shows the field interpolated without motion compensation; and

FIG. 11D shows the field generated by motion compensating interpolation according to the invention.

DETAILED DESCRIPTION OF THE INVENTION

1. General structure of the interpolator

In the description which follows, initially the entire structure of the motion compensating field interpolator is outlined. The motion compensating field interpolator essentially consists of three blocks: a displacement estimator, a change detector and a motion compensating interpolation (MCI) filter. These three blocks are described in detail in the following Sections 3, 4 and 5, respectively. Experimental results, which are based on the interpolation of more than 180 fields by means of computer simulations, are discussed in Section 6.

2. Structure of the motion compensating interpolator

Figure 1:
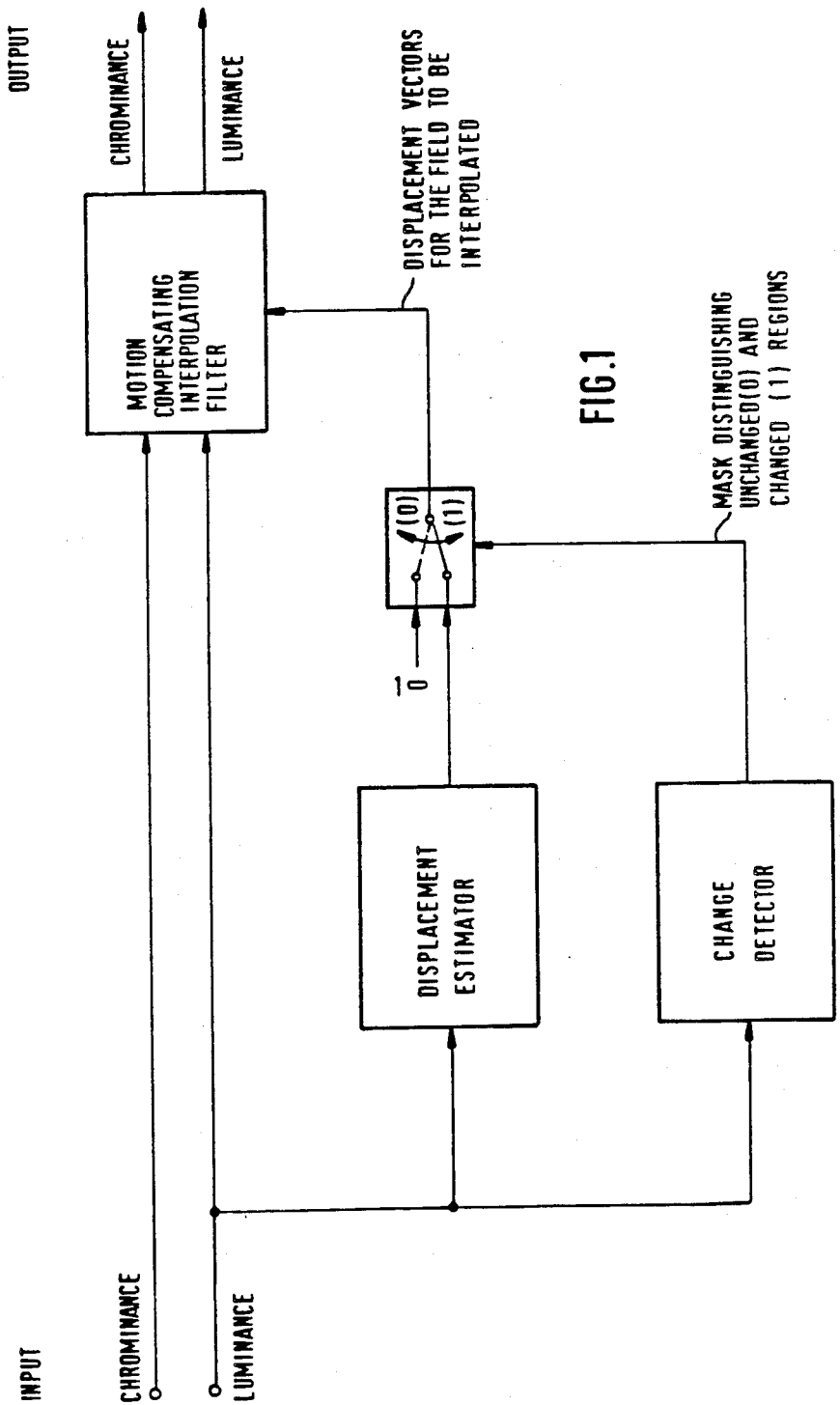
FIG. 1 is a block diagram showing the principle of the motion compensating field interpolator according to the invention.

The motion compensating field interpolator according to the invention consists of a displacement estimator, a change detector, and a motion compensating interpolation filter as shown in FIG. 1. The input data is a digital television sequence containing luminance and chrominance components in fields without line-interlace. For the case that the fields of a sequence are line-interlaced, a vertical filtering of every second field can be applied to obtain a non-interlaced format.

The interpolation algorithm is based on an image model, which is restricted to rigid objects translatorily displaced in the image plane. The displacement estimator calculates a displacement vector for each picture element of a field to be interpolated at a given temporal position between two available fields. The change detector distinguishes between changed and unchanged regions of the image contents and provides a binary output mask indicating whether each picture element belongs to a changed or unchanged area. As shown in FIG. 1, this output mask information is used to assign zero displacement vectors to the picture elements in unchanged areas. Thus, erroneously non-zero estimated vectors in these regions generated by the displacement estimator are eliminated. As shown, only the luminance data is used for displacement estimation and change detection by the displacement estimator and the change detector, respectively.

Each displacement vector is determined in such a way that it connects two picture elements of two available fields and crosses the spatial position of the picture element to be interpolated.

In the motion compensating interpolation filter, a weighted sum of the picture elements connected by the displacement vector is calculated for each picture element of the field to be interpolated. The displacement vectors, calculated by means of the luminance data only, are used for both the interpolation of the luminance signals and the interpolation of the chrominance signals in the MCI-filter.

3. Displacement estimator

3.1 The basic estimation algorithm

Figure 2:
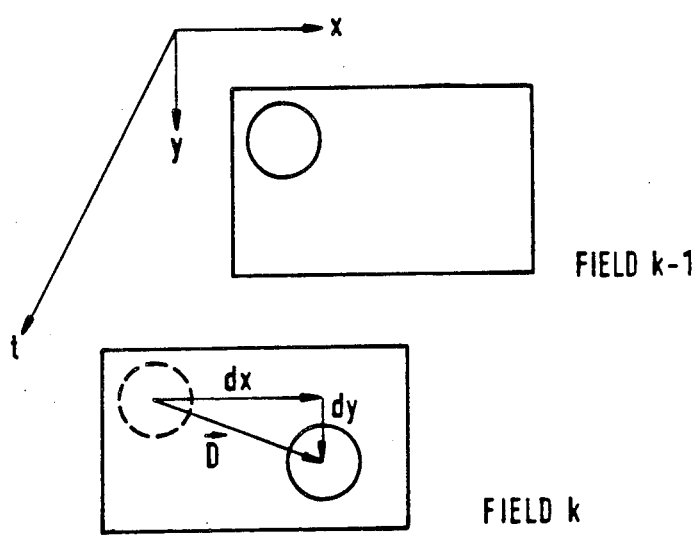
FIG. 2 is a diagram illustrating the translatory displacement in television sequences, in that an object has been displaced from field $k-1$ to field k by a vector D with the components dx,dy.

The estimation algorithm is based on the assumption of a translatorily displaced rigid object in the image plane that does not change its luminance from field $k-1$ to field $k$, as shown in FIG. 2. Then, for a moving area the equation $$S_{k-1}(x,y) = S_k(x+dx, y+dy) \quad (1)$$

holds, where $S_{k-1}(x,y)$ denotes the luminance in field $k-1$ at the spatial position x,y and $S_k(x+dx,y+dy)$ is the corresponding luminance, displaced by a vector D with the components dx,dy in field k. Thus, a moving object causes a frame difference signal FD, where $$FD(x,y) = S_k(x,y) - S_{k-1}(x,y). \quad (2)$$

Compensating the displacement by an estimated displacement vector $\hat{D}$ with the components $\hat{dx}, \hat{dy}$, the remaining frame difference, called displaced frame difference (DFD), results as $$DFD(x,y,\hat{D}) = S_k(x+\hat{dx}, y+\hat{dy}) - S_{k-1}(x,y). \quad (3)$$

Under the above mentioned assumptions, the DFD approaches zero if the estimate $\hat{D}$ is close to the true displacement vector D. In the above mentioned Bierling paper, an estimation algorithm is derived that minimizes the local mean squared displaced frame difference. The estimated displacement vector components are determined as $$\hat{dx} = \{E[\overline{G_x} \cdot \overline{G_y}] \cdot E[FD \cdot \overline{G_y}] - E[FD \cdot \overline{G_x}] \cdot E[\overline{G_y}^2]\}/DEN$$

$$\hat{dy} = \{E[\overline{G_x} \cdot \overline{G_y}] \cdot E[FD \cdot \overline{G_x}] - E[FD \cdot \overline{G_y}] \cdot E[\overline{G_x}^2]\}/DEN \quad (4a)$$

with the denominator $$DEN = E[\overline{G_x}^2] \cdot E[\overline{G_y}^2] - E^2[\overline{G_x} \cdot \overline{G_y}],$$

where the coordinates x,y are omitted for simplicity. The components $$\overline{G_x}(x,y) = \{\delta S_k(x,y)/\delta x + \delta S_{k-1}(x,y)/\delta x\}/2$$

$$\overline{G_y}(x,y) = \{\delta S_k(x,y)/\delta y + \delta S_{k-1}(x,y)/\delta y\}/2 \quad (4b)$$

are averages of first order derivatives of the luminance signal of two successive fields with respect to the coordinates x and y, respectively. The algorithm given by Eq. (4) has been derived using a two-dimensional polynomial of second order as an image model for the luminance signal $S_k(x,y)$ and $S_{k-1}(x,y)$. Due to this image model, and as shown in the Bierling paper, the precision of the estimate is improved compared to other known algorithms (see, for example, the above mentioned Bergmann paper and a paper by C. Cafforio et al, "Methods for measuring small displacements of television images", IEEE Trans. Inform. Theory, Vol. IT-22, No. 5, pp. 573–579, September 1976). Of course, in digital video processing the expectations in Eq. (4) have to be approximated by summing over measurement windows of a certain size. Usually these measurement windows are rectangular and an estimation obtained from Eq. (4) is then assigned to the center of the window. Also the spatial gradients have to be approximated by means of the samples of the luminance signal. Adopting a proposal from an article by C. Cafforio et al "The differential method for image motion estimation", Image Sequence Processing and Dynamic Scene Analysis, edited by T. S. Huang, Berlin, Germany: Springer-Verlag, pp. 104–124, 1983, the spatial derivatives are approximated as one-half of the difference between the two adjacent picture elements in the x- and y-direction, respectively.

It should be noted, that all vector components obtained by Eq. (4) are rounded to the nearest integer value. Thus, there are no non-integral vector components. Moreover, neither in the displacement estimation nor in the motion compensating field interpolation is there any need to perform any spatial interpolation of the picture elements between the lattice elements of field $k-1$ or field k. A signal containing any translatory motion in the image plane can be perfectly interpolated using integral displacement vector components, as shown for example in a paper by B. Girod et al "Motion-compensating field interpolation from interlaced and non-interlaced grids", 2nd Int. Tech. Symposium on Optical and Electro-Optical Applied Science and Engineering, Cannes, December 1985.

3.2 Motion compensating iteration

A displacement estimate, obtained by evaluating a differential estimation algorithm, is often far away from the true displacement, even if the present motion is restricted to pure translatory motion. This is due to the fact that the actual image signal differs drastically from the mathematical image model on which the algorithm is based. In this case, the displacement estimate can be improved by a motion compensating iteration of the estimation algorithm a explained below.

To obtain an estimate for the vector that indicates the displacement of an object which is displaced from an arbitrary position $x_0,y_0$ in the field $k-1$ to the unknown position $x_0+dx, y_0+dy$ in field k, the measurement windows are placed in such a way that the respective centers are given by $x_0,y_0$ for both fields. The five distinct expectations needed for Eq. (4a) are approximated by summing over these so placed windows. After calculating the components $dx, dy$, the estimate can be improved by a motion compensating iteration of the algorithm. For that purpose, the frame difference is compensated by the vector estimated up to now, i.e. by the vector obtained in the first step of iteration. This is done by displacing the measurement window in field k to the position $x_0+dx, y_0+dy$, and again calculating the five expectations. The frame difference FD in Eq. (4a) then changes into the displaced frame difference DFD given by Eq. (3) as a function of the previously calculated components $dx, dy$. Moreover, all terms belonging to field k have to be taken from the displaced position including the spatial derivatives of $S_k(x,y)$. The displacement vector calculated in this second step is added to the vector obtained in the first step of iteration. This procedure is repeated until a sufficiently precise estimation is achieved.

Figure 3A:
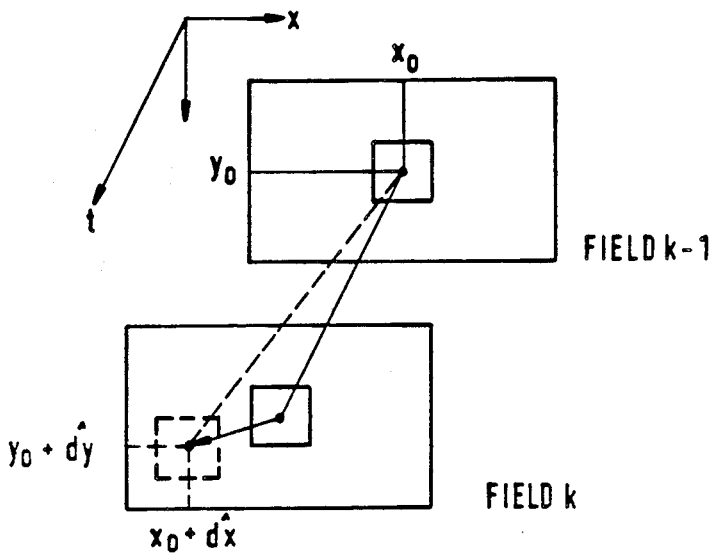
FIGS. 3A-3C are diagrams illustrating several motion compensating iteration techniques for displacement estimation using displaced measurement windows, and in particular techniques wherein the measurement window in field k is displaced (FIG. 3A), wherein the measurement window in field $k-1$ is displaced (FIG. 3B), and wherein the measurement windows are displaced symmetrically against each other (FIG. 3C).
Figure 3B:
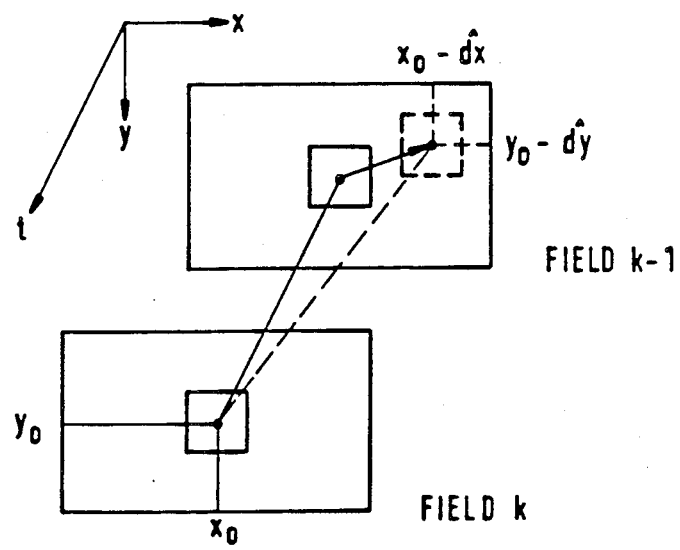

This kind of iteration technique, illustrated in FIG. 3A, when applied to all picture elements of field $k-1$ yields a displacement vector field that is uniquely defined for field $k-1$. However, it does not assign a displacement vector to all picture elements of field k. To obtain a vector field uniquely defined for field k, the measurement windows placed in field k are fixed, and those in field $k-1$ are displaced in the motion compensating iteration, as shown in FIG. 3B.

3.3 Symmetrized motion compensating iteration

Figure 3C:
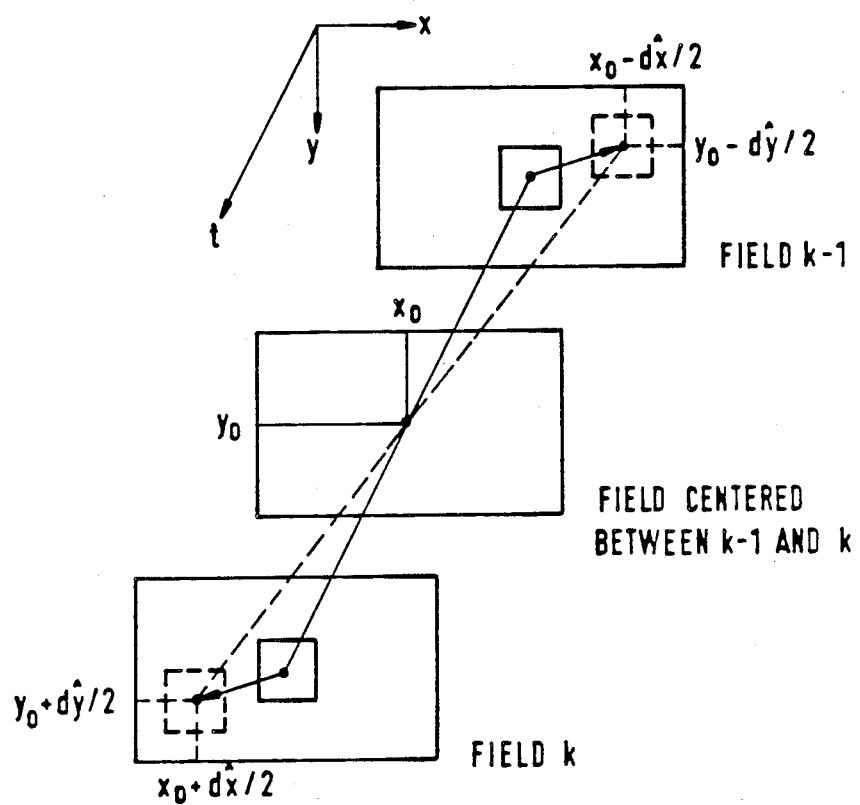

For motion compensating interpolation of a field at an arbitrary temporal position between two successive fields of a television sequence, a uniquely defined displacement vector field for the field to be interpolated is needed. Using the iteration technique described in Section 3.2, a vector field that is defined either for field $k-1$ or for field k is obtained. Thus, there is not an assignment of displacement vectors to all picture elements of the field to be interpolated. In order to overcome this problem a symmetrized iteration technique is adopted (see S. Beyer, "Displacement-Schätzverfahren für Fernsehbildsignale mit minimaler Schätzfehlervarianz", Ph.D. dissertation, Univ. of Hannover, Hannover, Germany, 1985). This symmetrized iteration technique is exemplarily explained for a field at the centered temporal position between field $k-1$ and k as shown in FIG. 3C. In the second step of the motion compensating iteration both measurement windows are displaced against each other. In the illustrated example, the window in field k is displaced to the position $x_0+dx/2, y_0+dy/2$ and the window in field $k-1$ is displaced to $x_0-dx/2, y_0-dy/2$. Thus, a displacement vector is obtained which connects an object displaced from field $k-1$ to field k and which crosses the spatial position $x_0,y_0$, whose vector is to be estimated, in the centered field. This approach can also be applied to fields at other temporal positions between two successive fields. The symmetrized iteration technique yields a displacement vector field that is uniquely defined for all picture elements of the field to be interpolated at a given temporal position.

In order to avoid any spatial interpolation of picture elements between the lattice elements of the fields, both measurement windows have to be displaced by an integer number of picture elements in each step of iteration. Thus, for the example shown in FIG. 3C, the motion compensating iteration by displacing the measurement windows symmetrically against each other always yields displacement vector components that are a multiple of two picture elements. At non-centered temporal positions between field k and $k-1$, the set of possible values for the displacement vector components is further restricted. For example, at the temporal position of one-fourth of the field distance to field $k-1$, the vector components are a multiple of four picture elements. To overcome this problem, a special procedure for the motion compensating interpolation of three fields between every two given fields is applied, as described in Section 6.2.

3.4 Spatial and temporal recursion

One can decrease the number of iterations needed to obtain a sufficiently precise estimation by recursion techniques. A recursive estimation starts like the second step of iteration as described in Section 3.2. For a spatial recursion, an initial guess obtained by means of displacement vectors previously calculated for adjacent picture elements serves for the first motion compensation step. Thus, only an update term is determined and added to the initial vector. This technique has been investigated by several authors, e.g. A. N. Netravali et al "Motion compensated television coding-Part I", Bell Syst. Technical Journal, Vol. 58, pp. 631-670, March 1979. A temporal recursion is performed by using the displacement vector field determined for the previous field of the image sequence. An algorithm described in an article by R. Paquin, "A spatio-temporal gradient method for estimating the displacement vector field in time-varying imagery", Computer Vision, Graphics, and Image processing 21, pp. 205-221, 1983, makes use of this technique. Both, spatial and temporal recursion techniques involve the risk of estimation error propagation at object boundaries and in the case of non-stationary moving objects.

For the present, these types of recursive techniques are not considered in the motion compensating interpolation algorithm described here.

3.5 Hierarchically structured displacement estimator

One of the most critical parameters of a differential displacement estimator is the size of the measurement window used for the approximation of the expectations. The largest window which can be used covers the entire image, and only a reasonable displacement estimation is obtained if the entire picture contents are displaced as one moving object, e.g. in the case of panning. However, for the purpose of motion compensating interpolation, an estimate locally approximating the present motion at each picture element is needed rather than a mean value of displacements caused by several moving objects. On the other hand, when using very small windows, e.g., of 3 by 3 picture elements, the estimate tends to be unreliable. In the case of large displacements there may be no correspondence between the contents of these small windows placed in two successive fields of a television sequence. That means that these windows contain two absolutely different image parts, and the evaluation of the differential estimation algorithm does not make any sense. The differential estimation of the displacement vector for a moving object covered only by one of the measurement windows is impossible. Moveover, when using small windows the expectations are approximated insufficiently, and consequently it is only possible to cope with displacements of one or two picture elements at the most. Thus, large measurement windows are needed to cope with large displacements. On the other hand, small windows are required to be sufficiently locally adaptive.

In order to overcome this problem, a hierarchically structured displacement estimator has been developed. According to the invention, a motion compensating iteration as described in Sections 3.2 and 3.3 with large window sizes is applied in the first steps of iteration, and the image signal is filtered by FIR lowpass filters in these first steps. From one step to another step of iteration, the window size is decreased and the filtering is reduced. The first steps of iteration serve to cope with large displacements. The filtering provides an image signal which is matched to the image model on which the estimation algorithm is based. Thus the estimate becomes less precise in favor of an increased reliability. After motion compensation by means of the vector estimated in the first steps of iteration, the residual displacement has to be estimated in the next steps more precisely. The smaller the residual displacement, the smaller the window sizes can be chosen, thus avoiding the risk of estimation errors. Upon coming close to the actual displacement to be estimated, the algorithm is evaluated on the basis of the unfiltered image signal.

To limit the computational complexity in the first steps of iteration, preferably the picture signal is spatially subsampled according to the bandlimitation achieved by the FIR filtering. This can be done in such a way that the number of picture elements involved by the measurement windows is identical in each step, although the image part covered by the windows differs from one to another step of iteration.

Figure 4A:
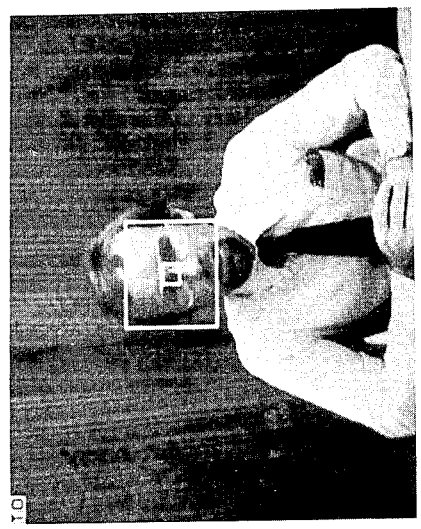
FIGS. 4A and 4B illustrate two distinct measurement windows spaced in two successive fields $k-1$ and k, respectively, and with the two windows in each field being of a size of 65 by 65 and 13 by 13 picture elements, respectively.
Figure 4B:
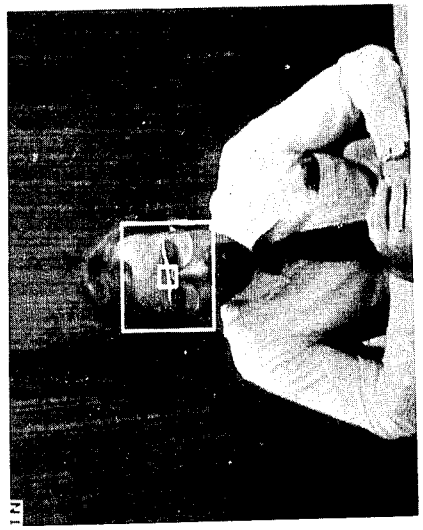
Figure 5A:
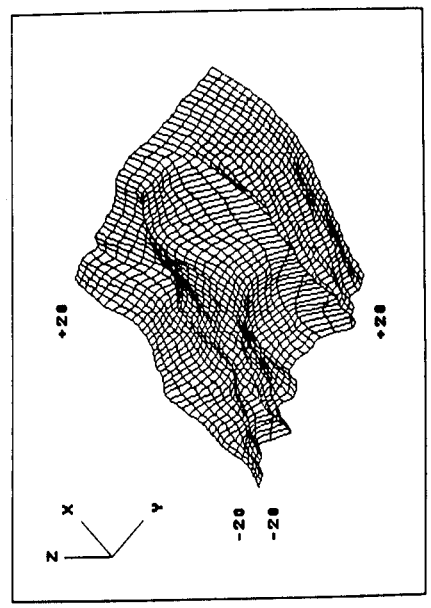
FIGS. 5A and 5B are 3-D plots of the approximated expectation of the squared displaced frame difference (z-axis) versus the displacement vector components dx,dy (x- and y-axis), with the results having been obtained by displacing the measurement windows placed in the field shown in FIG. 4A to all positions up to 20 picture elements around the shown initial position ($x=0,y=0$) in the horizontal (y-) and vertical (x-) direction. The windows placed in the field shown in FIG. 4B are fixed.
Figure 5B:
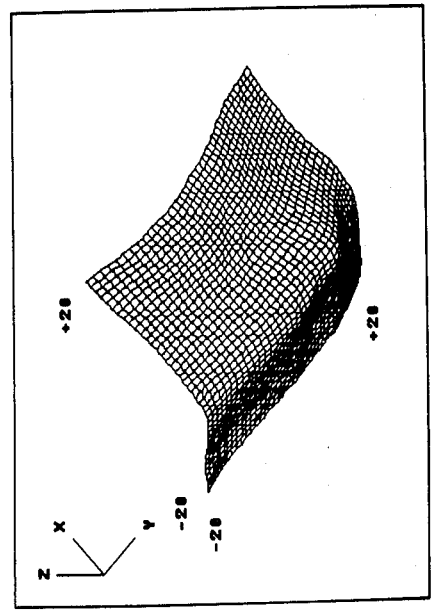

To demonstrate the influence of the window size on the reliability of the estimate, the following example is given FIGS. 4A and 4B show two successive fields of a television sequence. To consider the estimation of the displacement vector for the picture element given by the center of the measurement windows placed at the same spatial position in field $k-1$ (FIG. 4A) and in field k (FIG. 4B), two distinct window sizes are used as shown, with the smaller one of the windows being 13 by 13 picture elements and the other larger of the windows being 65 by 65 picture elements. As mentioned in Section 3.1 above, the expectation of the squared displaced frame difference is applied as an optimization criterion for the estimate. The algorithm uses a spatio-temporal gradient method to estimate the minimum of this expectation. FIGS. 5A and 5B show the respective 3-D plots of the optimization criterion versus the displacement vector components dx,dy, with the results having been obtained by displacing the measurement windows in field $k-1$ horizontally and vertically to all positions up to 20 picture elements around the initial position. The windows in field k are fixed. As can be seen from FIG. 5A, the window size of 13 by 13 picture elements obviously is too small in order to recognize a definite minimum. In fact, the algorithm results in an estimate dy=0 in contrast to the actual displacement of about 8 picture elements. The result shown in FIG. 5B was obtained by using the window size of 65 by 65 picture elements. In this case, the image signal covered by the windows has been bandlimited by a FIR filter and subsampled by a factor of 4:1 horizontally and vertically. The minimum of the optimization criterion can be identified clearly but not precisely. The accuracy of the estimate can be increased in a second step of iteration using smaller measurement windows and evaluating the algorithm on the unfiltered image signal.

As mentioned above and as shown in FIG. 12, filtering is reduced for the luminance signals $S_k$ and $S_{k-1}$ from one step to another step of the iteration N and subsampling is used to limit the computational complexity. This is done by filtering means FS1, ... FSN of FIG. 12. For each iteration step, a displacement is estimated by means of a respective EDEA unit to which are fed the filtered and subsampled luminance signals $S_k$, $F_n$; $S_{k-1}$, of field k and field $k-1$, respectively, in the n'th step of the hierarchy as well as the displacement vector $\vec{D}_n$ obtained in the preceding iteration step as an initial vector. For the first step of iteration, a zero vector $\vec{0}$ is used as the initial vector.

Figure 12:
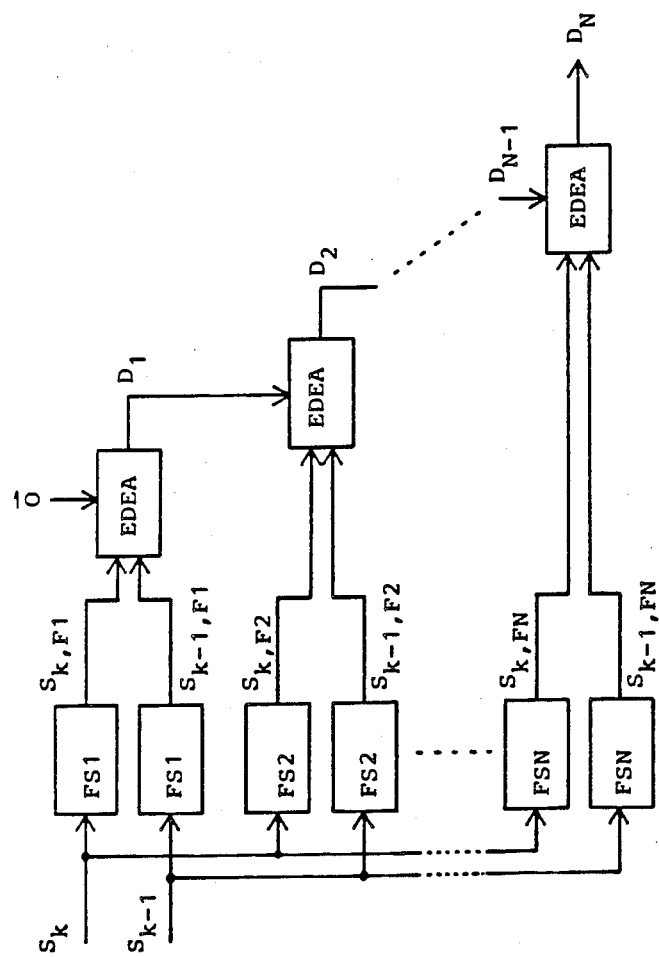
FIG. 12 is a block diagram showing the principle of the hierarchically structured displacement estimator of FIG. 1 for the case of N steps of hierarchy.
Figure 13:
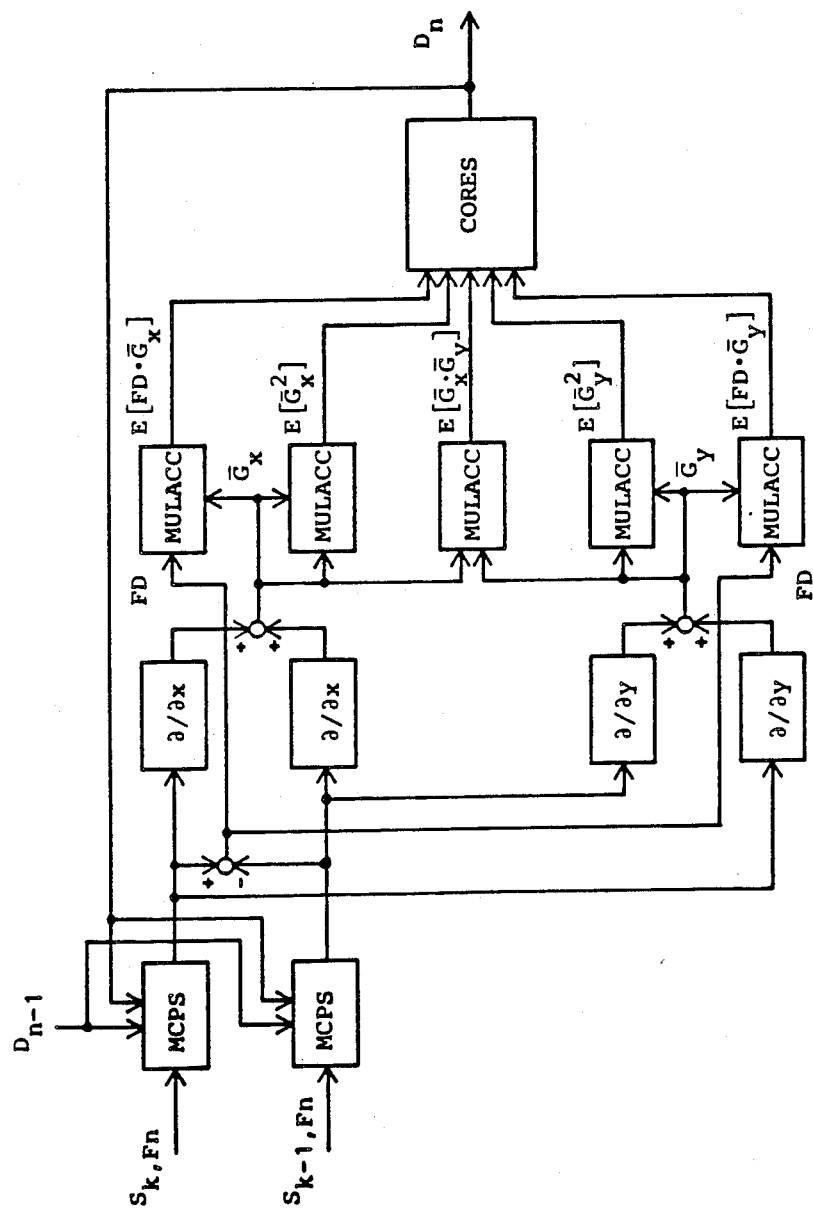
FIG. 13 illustrates the evaluation of the displacement estimation algorithm according to Equation (4).

The EDEA units shown in FIG. 12 are shown in more detail in FIG. 13. As shown in this figure, the filtered and subsampled luminance signals $S_k$, $F_n$; $S_{k-1}$, $F_n$ of field k and field $k-1$ are each fed to a motion compensated pixel selection unit MCPS according to FIG. 3c. This unit MCPS processes the initial displacement vector $\vec{D}_{n-1}$ and the calculated displacement $\vec{D}_n$ with the filtered and subsampled luminance signal $S_k$, $F_n$ and $S_{k-1}$, $F_n$ respectively as described above with respect to FIG. 3c.

The frame difference signal FD is then formed by a subtracting stage according to Equation (2).

With the aid of stages $\theta/\theta x$ and $\theta/\theta y$, the first order derivatives of the luminance signal of two successive fields are formed. These derivatives are added according to Equation (4b) to get the components $\overline{G}_x$ and $\overline{G}_y$. Multiplication and accumulation units MULACC are provided to get the expectation values $E[FD \cdot \overline{G}_x]$, $E[\overline{G}_x^2]$, $E[\overline{G}_x \cdot \overline{G}_y]$, $E[\overline{G}_y^2]$, and $E[FD \cdot \overline{G}_y]$. These expectation values are combined according to Equation (4a) by unit CORES.

4. Change detector 4.1 Principle of change detection

A change detector distinguishes between temporally changed and unchanged regions of two successive fields. The assignment of picture elements of these fields to the changed area is oftentimes wrong because of scene inherent noise in the unchanged area. The aim of the change detector is to decide whether the temporal changes are caused by noise or by relevant changes due to motion of objects or illumination changes.

For this purpose, known change detection algorithms, (for example, see the above identified Haskell et al and Netravali et al articles) evaluate the frame difference for every picture element of the two successive fields. If the frame difference exceeds a given threshold, the picture element is assigned to be changed, otherwise to be unchanged. Thus, the change detector provides a binary mask indicating the changed and unchanged areas of the two successive fields.

However, this detection is affected by the appearance of noise, i.e., picture elements are assigned to the changed region but belong to the unchanged region or vice versa. To overcome this problem, the frame differences are summed up over a measurement window and the outcome is compared with a given threshold (for example, see the above identified Haskell et al and Klie articles). This operation leads to binary masks with changed areas much larger than effectively caused by the moving object, or to boundaries which are frayed out between unchanged and changed regions.

Figure 6:
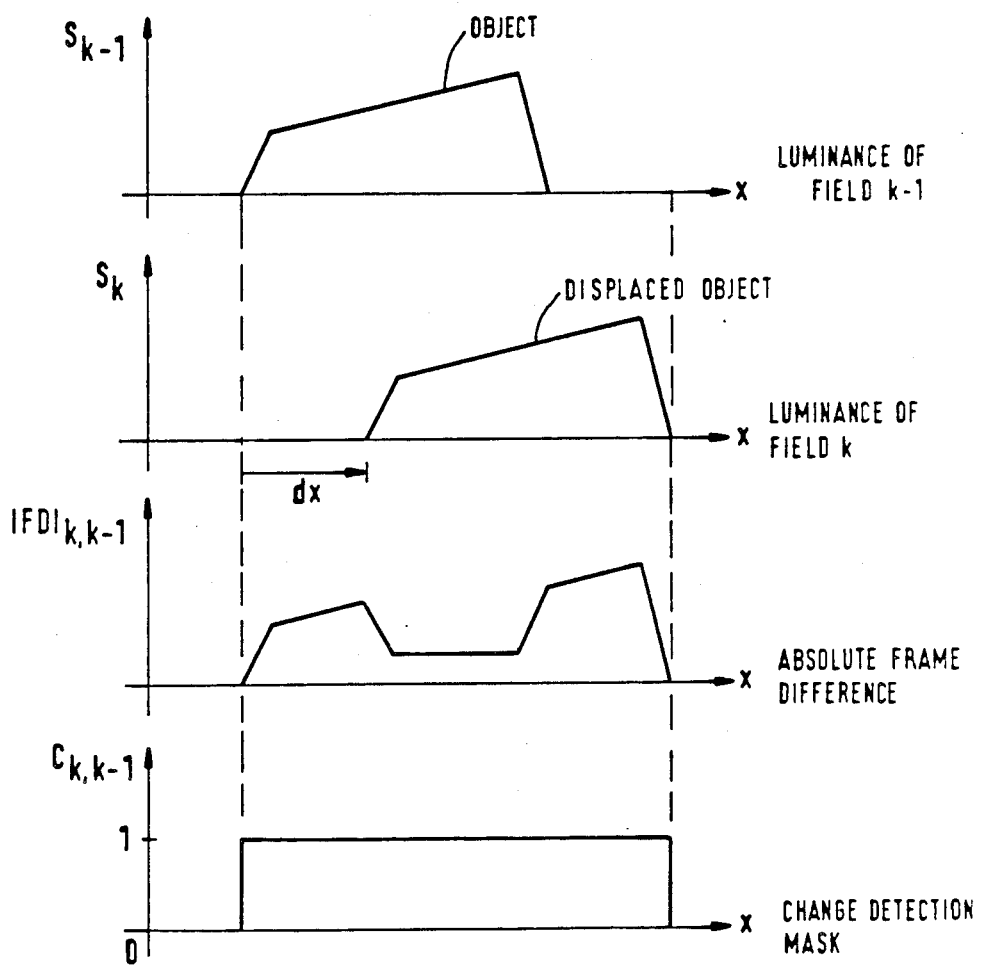
FIG. 6 shows a plurality of signal curves illustrating the change detection for the case of a one-dimensional signal.

FIG. 6 illustrates the change detection using a one-dimensional signal as an example. As shown by the upper two signals in this figure, an object has been moved by a displacement dx from field $k-1$ to field k. The absolute frame differences are compared with a threshold of zero, assuming a noiseless signal, so that the resulting change detection mask distinguishes between the changed and unchanged regions. As shown in the last line of FIG. 6, this mask borders on the left-hand boundary of the object in field $k-1$ and on the right-hand boundary of the displaced object in field k.

4.2 The change detection algorithm

Figure 7:
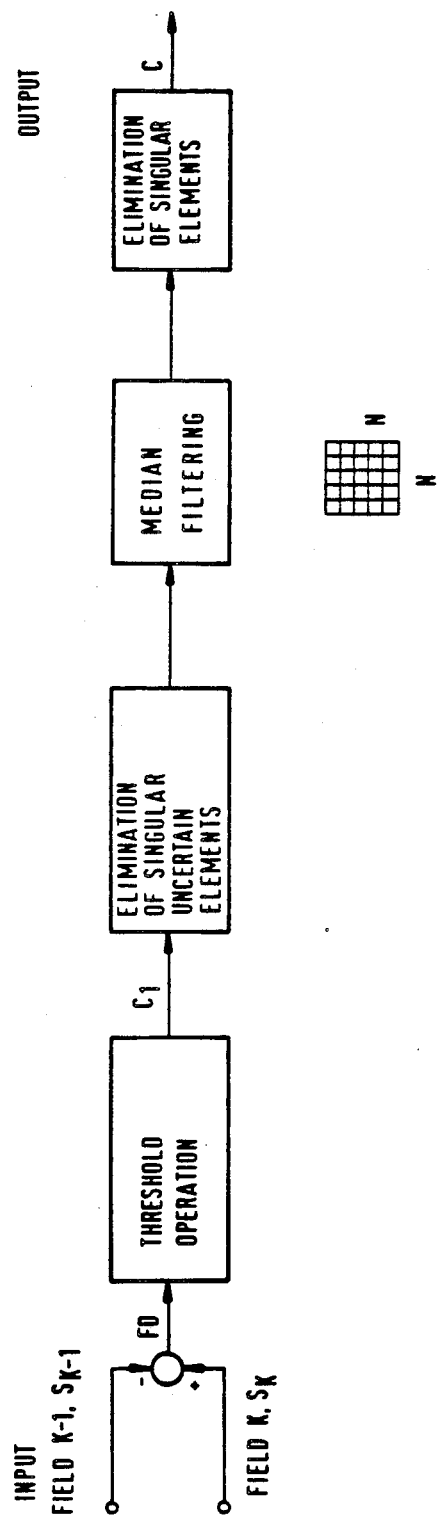
FIG. 7 is a block diagram of the change detector of FIG. 1.

FIG. 7 shows the block diagram of the preferred change detector according to the invention which determines the frame differences and performs a threshold operation, an elimination of singular uncertain elements, a median filtering, and an elimination of singular elements.

As shown in FIG. 7, initially the frame difference FD between field k and field $k-1$ is calculated from the respective luminance signals $S_k$, $S_{k-1}$ as defined in Eq. (2). Thereafter, the absolute frame difference for each picture element is independently evaluated and, as a result of this evaluation, one of three states, i.e., unchanged $C_1=0$, changed $C_1=1$ or uncertain $C_1=X$, is assigned to each element of an image. Using the uncertain state $C_1=X$, misdecisions caused by noise can be avoided in the first processing step. Therefore, the uncertain state is treated separately in a further operation Picture elements are assigned to the unchanged state ($C_1\hat{=}0$) if the absolute frame difference $|FD|$ is below a certain threshold $T_1$, and to the changed state ($C_1\hat{=}1$) if the absolute frame difference $|FD|$ is above another certain threshold $T_2>T_1$. The remaining picture elements are assigned to the uncertain state ($C_1=X$). The selection of the thresholds $T_1$ and $T_2$ has to be adapted to the noise amplitude in the image sequence.

To obtain a binary mask distinguishing only between changed and unchanged picture elements, an elimination of singular uncertain elements is performed and non-singular uncertain elements are assigned to the changed state. An element is defined to be singular, if this element is of one type, changed or unchanged or uncertain, and at least six direct neighboring elements are of another type, that means unchanged or changed. Thus, each of the singular uncertain elements is assigned either to the unchanged area, if the neighboring picture elements are of the changed type, or to the changed area, if the neighboring picture elements are of the unchanged type. The remaining uncertain elements are assigned to the changed region. Now there exists a binary mask distinguishing between changed and unchanged elements for each picture element of the two transmitted fields.

In the following step, a median filter is applied, using measurement windows of the size of N by N picture elements. If $N^2/2+1$ picture elements of the mask belong to the changed area, the picture element in the center of the window is assigned to the changed area too or vice versa. This filter can be implemented as a simple counting operation. The median filtering smooths the boundaries between the changed and the unchanged area. Further, small regions misdecided in the previous steps are corrected.

In the last processing step as shown in FIG. 7 (named elimination of singular elements), any still remaining singular picture elements are reassigned to the state of the neighboring elements, so that the output C is either a 1, indicating a changed state or a 0, indicating a unchanged state.

Figure 8:
FIG. 8 illustrates the change detection mask obtained by evaluating the frame difference signal shown in FIG. 10B. Unchanged areas are black displayed. The image contents of the first of two consecutive transmitted fields are inserted in the changed areas.

FIG. 8 shows an example of the change detection mask obtained by computer simulations. In the simulation, the thresholds for the change detector were chosen at $T_1=3/256$ and $T_2=6/256$, where 256 is due to the quantization according to 8 bits per sample. The median filtering was performed using a window size of 5 by 5 picture elements. The resulting change detection mask preserves the moving object in the changed regions in its entirety and is adapted well to the boundaries of the moving objects.

5. Motion compensating interpolation filter

The motion compensating interpolation (MCI) filter calculates each picture element of the fields to be interpolated by means of two transmitted fields and by means of the estimated horizontal and vertical displacement vector components (FIG. 1). Because of the integral displacement vector components (see Section 3.1) the MCI filter reduces to a two-coefficient spatio-temporal filter.

With the help of the integral displacement vector components estimated for the position x,y, first the addresses of the corresponding picture elements in the transmitted fields are determined. They are needed to calculate the picture element at the position x,y in the field to be interpolated. The displacement vector as well as the two picture elements are multiplied by weighting factors which correspond to the temporal distances between the field to be interpolated and the transmitted fields. Then the picture element to be interpolated results from the addition of the two weighted picture elements.

Figure 9:
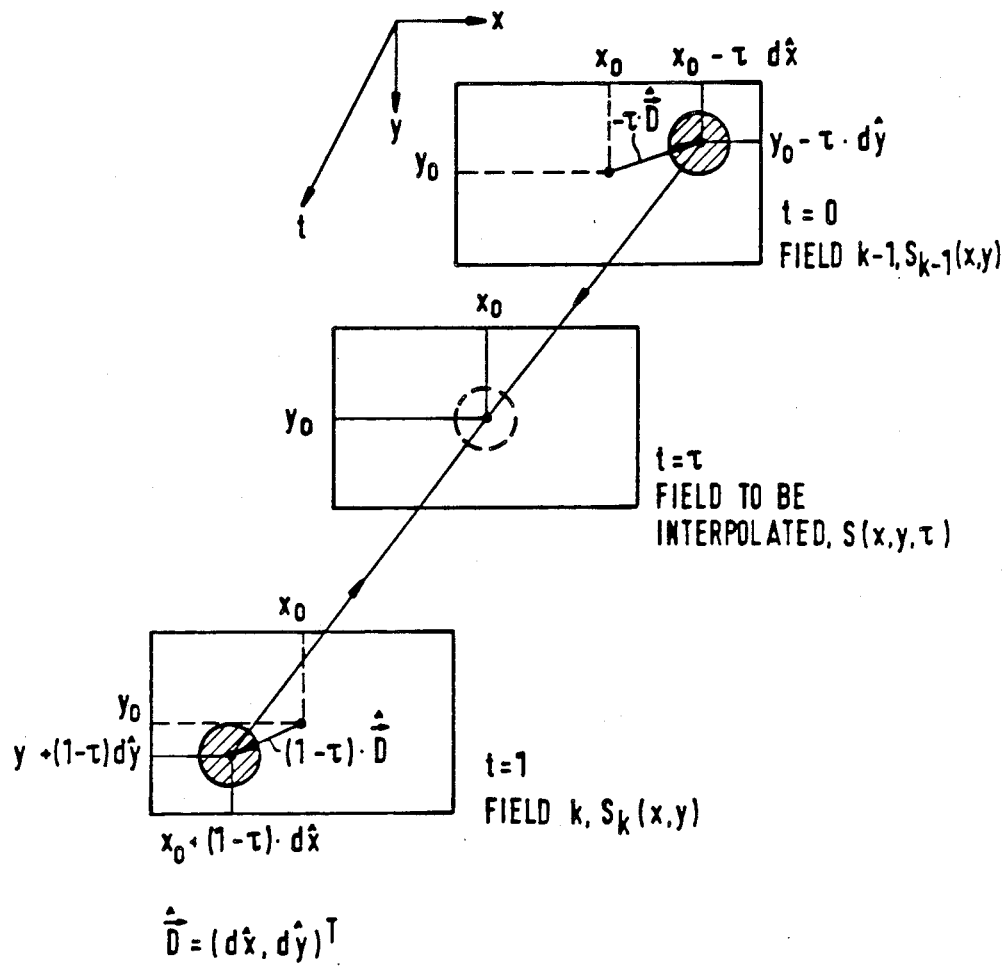
FIG. 9 illustrates the operation of the motion compensating interpolation filter of FIG. 1. The picture element at $x_0,y_0$ in the field to be interpolated is calculated by a weighted sum of the picture elements in fields k and $k-1$ connected by the displacement vector D.

FIG. 9 illustrates the operation of the MCI-filter algorithm. The transmitted fields have the associated temporal position $t=0$ for field $k-1$ and $t=1$ for field k. The intermediate position $t=\tau$ with $0\leq\tau\leq1$ corresponds to the temporal distance of the field to be interpolated to the field $k-1$. Each picture element of the field to be interpolated is calculated as a function of the displacement vector components and the temporal position $\tau$ as $$S(x,y,\tau) = \{1-\tau\}\cdot S_{k-1}(x-\tau\cdot\hat{dx}, y-\tau\cdot\hat{dy}) + \tau\cdot S_k(x-\{1-\tau\}\cdot\hat{dx}, y-\{1-\tau\}\cdot\hat{dy}) \quad (5)$$

with $0\leq\tau\leq1$.

In the MCI-filter, the displacement vectors estimated by means of the luminance data only are also used to interpolate the chrominance signals.

6. Experimental results 6.1 Test sequences

Figure 10B:
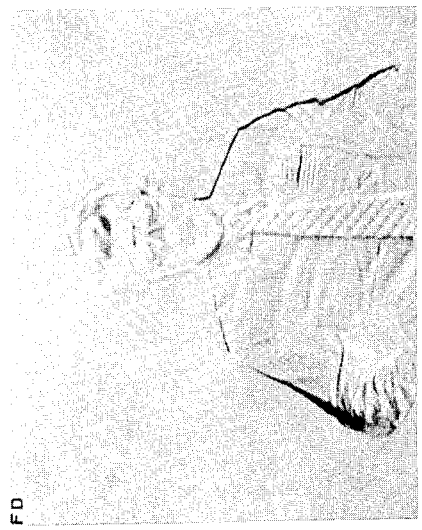
FIGS. 10A-10D demonstrate the motion compensating field interpolation for the case of transmitting every fourth field. All fields shown are taken from the temporal centered position between two consecutive transmitted fields, with only the luminance components being displayed. In these figures.
Figure 10D:
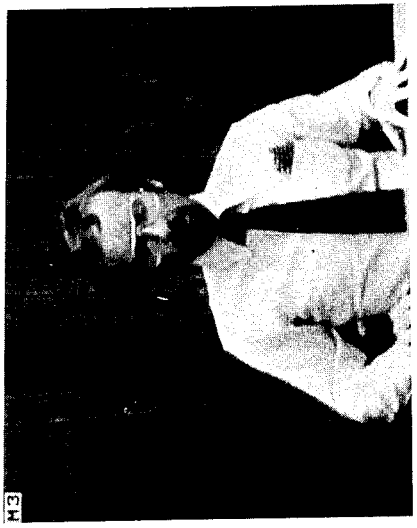
Figure 10A:
Figure 11B:
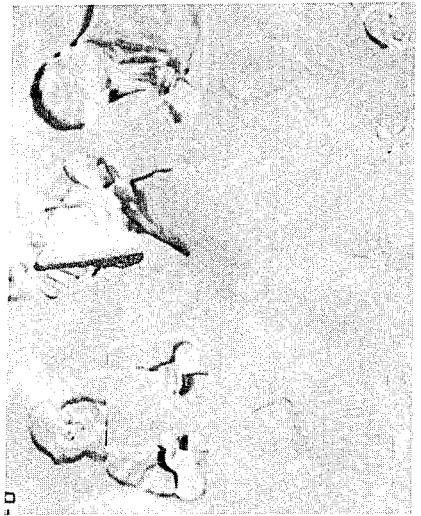
FIGS. 11A-11D demonstrate the motion compensating field interpolation for the sequence "Split Screen". All simulation and display parameters are the same as in FIG. 10. In these figures.
Figure 11D:
Figure 11A:

The described motion compensating field interpolator and methods according to the invention have been experimentally investigated by means of computer simulations. Two typical video conference scenes with 50 Hz field frequency have been used for the simulations; and in particular, "Trevor" consisting of 150 fields, and "Split Screen" consisting of 100 fields. These sequences have been selected by the European COST 211bis simulation subgroup for testing of video conference codecs. The original sequences were sampled at 13.5 MHz for the luminance component (Y) and at 6.75 MHz for each chrominance component (R−Y,B−Y), and uniformly quantized according to 8 bits per sample. For the simulations of the interpolator, the horizontal resolution of the luminance and chrominance components were reduced to one half of the original sampling rate. Thus, every luminance field consisted of 288 lines with 312 picture elements per line, and the chrominance fields consisted of 288 lines with 156 picture elements per line. FIG. 10A and FIG. 11A show the luminance of one original field for each sequence in the specified format. With the aim of data compression, the field frequency was reduced to 12.5 Hz by omitting three fields out of four fields at the transmitter. There was no need to be concerned about the effects from line-interleaving as a result of dropping an odd number of successive fields. At the receiver, the omitted fields were reconstructed by means of described motion compensating interpolator according to the invention. Finally, the reconstructed sequences were converted to the standard line-interleaving format by vertical filtering of every second field in order to display the sequences on a standard video monitor.

6.2 Simulation parameters

The problems due to the integer estimation of the displacement vector components, using the symmetrized motion compensating iteration technique at non-centered temporal positions between two available fields, are reduced by interpolating the fields in a special order. First, the second of the three omitted fields is interpolated by itself at the centered temporal position. Then, the other two fields are interpolated, now being at the centered temporal position between one of the originally transmitted fields and the field previously interpolated. The luminance data only is used to calculate the displacement vector fields and the change detection masks. The displacement vector fields are applied for the interpolation of both the luminance and the chrominance fields.

The parameters for the displacement estimation are listed in the following Table 1, and the impulse responses for the FIR filters, used for the bandlimitation of the image signal, are listed in the following Table 2.

TABLE 1

Parameters for the hierarchically structured displacement estimator as used for the simulations.

| | |
|---|---|
| WV, WH = | Height and width of the rectangular measurement windows (in picture elements). |
| F = | Name of the filter used for the bandlimitation of the image signal. The impulse responses are listed in Table 2. |
| SF = | Subsampling factor for the image contents of the measurement windows. |
| I = | Number of iterations performed in each step of the hierarchy. |
| GV, GH = | Vertical and horizontal distance between the picture elements belonging to the grid for which the displacement vector field is estimated. |

| Step of hierarchy | WV, WH | F | SF | I | GV, GH |
|---|---|---|---|---|---|
| 1 | 65, 65 | FIL1 | 4 | 3 | 8, 8 |
| 2 | 27, 27 | FIL1 | 4 | 3 | 4, 4 |
| 3 | 13, 13 | FIL2 | 2 | 3 | 2, 2 |

TABLE 2

Impulse responses of the digital FIR filters used for the bandlimitation of the image signal.

| Filter | Impulse response |
|---|---|
| FIL1 | −13, −9, 8, 37, 66, 78, 66, 37, 8, −9, −13 |
| FIL2 | 13, −1, −25, −1, 79, 126, 79, −1, −25, −1, 13 |

The displacement estimation algorithm was evaluated using the hierarchical structure combined with the symmetrized motion compensating iteration technique as described above. As can be seen from Table 1, three steps with distinct parameters were used, and in each step three iterations were performed. The displacement vectors were estimated only for a certain subset of picture elements rather than for all spatial positions in each step of the hierarchy. For the other picture elements the vectors were obtained by bilinear interpolation, calculating a distance-weighted average of the nearest four vectors belonging to the rectangular grid for which the vector field was estimated. The magnitude of the displacement vector components was limited to 60 picture elements in the x- and y-direction.

6.3 Discussion of the results

The sequences, reconstructed by the motion compensating interpolator according to the invention were compared to the results obtained without motion compensation. For this purpose, the sequences were displayed on a video monitor using a real-time image display system. The sequences obtained by linear interpolation, as well as those generated by field repetition, showed visible degradations. The picture quality was degraded as a result of the relatively large amount of motion. However, the motion compensating interpolation technique according to the invention yielded unblurred moving objects widely preserving the natural impression of motion.

Figure 10C:
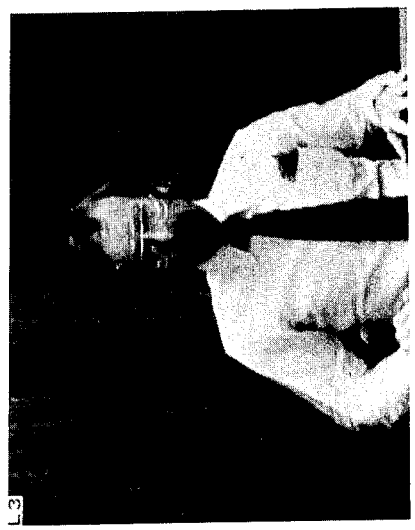
Figure 11C:

In order to give an impression of the performance of the method according to the invention, several photos taken from the television screen are presented as monochrome pictures. FIG. 10A and FIG. 11A each show one original field of the sequence "Trevor" and the sequence "Split Screen", respectively. In order to demonstrate the amount of motion, the frame difference signals between the two transmitted fields which were used as input data for the interpolator, are shown for both sequences in FIG. 10B and FIG. 11B, respectively. FIG. 10C and FIG. 11C show the respective fields generated for the centered temporal position between the two transmitted fields by means of linear interpolation. Blurring can be recognized in all moving areas of these latter figures. The results obtained by using the interpolator with the hierarchically structured displacement estimator according to the invention are shown in FIG. 10D and FIG. 11D.

7. Conclusion

An algorithm for motion compensating field interpolation in digital television sequences is presented. Linear interpolation and field repetition techniques without motion compensation yield visible degradations as blurring and jerkiness. In order to avoid these effects, the motion of objects has to be taken into account.

According to the invention, a hierarchically structured displacement estimator is provided which is able to cope with large displacements by means of motion compensating iterations. As is shown, the evaluation of the estimation algorithm on large measurement windows combined with a lowpass filtering of the image signal in the first steps of the hierarchy increases the reliability of the estimation results. The computational complexity due to the large windows can be decreased by subsampling the filtered image contents according to the bandlimitation. A symmetrized iteration technique enables the provision of displacement vector fields which are defined for the fields to be interpolated. Erroneous non-zero vectors in unchanged areas, which may cause jitter, are suppressed by a special change detector. Using these vector fields for the motion compensating interpolation, the rendition of motion is remarkably improved when compared to known interpolation techniques.

The described interpolation scheme allows the unblurred reconstruction of several fields between every two transmitted fields using integer displacement vector components. The evaluation of nearly 200 fields, interpolated by computer simulations for the case of transmitting only every fourth field of a sequence, shows that the natural impression of motion is widely preserved. Some remaining visible artefacts were due to large displacements of more than 60 picture elements or non-translatory motion, which were not sufficiently approximated by displacement vectors.

However, the price paid for the remarkably improved picture quality achieved by the interpolation method according to the invention is a relatively complex algorithm.

As can be appreciated from the above description, the method according to the invention can be used for the following purposes: the reconstruction at the receiver of one or more omitted television images between every two transmitted fields of a digital television sequence; the generation of one or more additional fields between every two successive images; and/or the motion compensating noise reduction of digital television sequences.

It will be understood that the above description of the present invention is susceptible to various modifications, changes and adaptations, and the same are intended to be comprehended within the meaning and range of equivalents of the appended claims.

What is claimed is:

1. In a method of motion compensating interpolation of one or more fields between every two transmitted fields of a digital television signal including the steps of generating a displacement vector from an image signal of the television signal by an iteration process for each picture element of the field to be interpolated, assigning zero displacement vectors to picture elements in unchanged picture areas by means of a change detector, and feeding the resulting displacement vectors and the image signal to a motion compensating interpolation filter to produce image output signals corresponding to the interpolated field; the improvement wherein said step of generating includes:

applying a hierarchically structured displacement estimation to cope with large displacements wherein after motion compensation by means of the vector estimated in the first steps of iteration, the residual displacement is estimated in the next steps more precisely; providing the displacement vector with integer components; and carrying out a symmetrized motion compensating iteration which results in displacement vectors defined for a temporal position of the fields to be interpolated such that the interpolation filter interpolates each picture element of the fields to be interpolated by means of a displacement vector and a picture element of every two transmitted fields.

2. A method as defined in claim 1, wherein said step of applying a hierarchically structured displacement estimation includes: low-pass filtering the image signal and applying large displacement windows to estimate large displacements, which serve as initial values for the next steps of the iteration process, during the first steps of the hierarchically structured displacement estimation; and, in the last steps of the hierarchically structured displacement estimation, using the unfiltered image signal and small measurement windows to estimate the displacement vector components locally adaptively.

3. A method as defined in claim 2 wherein said step of assigning includes: calculating the absolute frame difference between the two transmitted fields from the respective image signals; comparing the absolute frame difference to at least one threshold value; as a result of said comparison, assigning a binary signal value for each picture element indicating whether the respective picture element belongs to the changed or unchanged areas of the image to produce a first binary change detection mask; filtering said first binary change detection mask, to produce a second binary change detection mask, by means of a median filter using measurement windows such that boundaries between changed and unchanged areas of said second binary change detection mask are adapted to the boundaries of moving objects in the image; and utilizing said second binary change detection mask to assign zero displacement vectors to the picture elements in unchanged areas of the image.

4. A method as defined in claim 1 wherein said step of assigning includes: calculating the absolute frame difference between the two transmitted fields from the respective image signals; comparing the absolute frame difference to at least one threshold value; as a result of said comparison, assigning a binary signal value for each picture element indicating whether the respective picture element belongs to the changed or unchanged areas of the image to produce a first binary change detection mask; filtering said first binary change detection mask, to produce a second binary change detection mask, by means of a median filter using measurement windows such that boundaries between changed and unchanged areas of said second binary change detection mask are adapted to the boundaries of moving objects in the image; and utilizing said second binary change detection mask to assign zero displacement vectors to the picture elements in unchanged areas of the image.

5. A method as defined in claim 1 wherein the image signal is the luminance signal of the television signal.

6. A method as defined in claim 5 wherein the television signal is a color signal including luminance and chrominance signals; and further comprising feeding both the luminance and chrominance signals to said motion compensating interpolation filter; and utilizing only the luminance signal for the generation of said displacement vectors.

7. A method as defined in claim 2 further comprising using said method for the reconstruction, at a television receiver, of one or more omitted television images between every two transmitted fields of the digital television signal.

8. A method as defined in claim 2 further comprising using said method for the generation of one or more additional fields between every two successive images.

9. A method as defined in claim 2 further comprising using said method for the motion compensating noise reduction of digital television signal.

10. A method as defined in claim 3, further comprising using said method for the reconstruction, at a television receiver, of one or more omitted television images between every two transmitted fields of the digital television signal.

11. A method as defined in claim 3 further comprising using said method for the generation of one or more additional fields between every two successive images.

12. A method as defined in claim 3 further comprising using said method for the motion compensating noise reduction of a digital television signal.

* * * * *